UNITED STATES PATENT OFFICE.

JOSEPH W. WEISS, OF MADISON, WISCONSIN, ASSIGNOR TO FRENCH BATTERY & CARBON CO., OF MADISON, WISCONSIN, A CORPORATION OF WISCONSIN.

METHOD OF MIXING BATTERY MATERIAL.

1,377,645.  Specification of Letters Patent.  Patented May 10, 1921.

No Drawing.   Application filed November 14, 1918.  Serial No. 262,415.

*To all whom it may concern:*

Be it known that I, JOSEPH W. WEISS, a citizen of the United States, residing at Madison, in the county of Dane and State of Wisconsin, have invented a certain new and useful Method of Mixing Battery Material, of which the following is a specification.

In the construction of electric batteries, and particularly in that of depolarizing material, I have found that a certain degree of inefficiency exists in the battery due to the fact that two of the essential constituents of the depolarizing material, manganese dioxid and carbonaceous conductive material, such for instance as graphite or lampblack, are not mixed together so that they are in the most intimate contact such as will produce the best battery results. I have also found a great difficulty in properly mixing such materials so they are capable of producing the desired results.

This invention consists in a method of so mixing the materials of depolarizing materials that they are brought into unusually close contact with each other, and in a battery composed of materials so brought into contact.

The ordinary method of mixing materials such as manganese dioxid and carbonaceous material has ordinarily consisted in first mixing the more or less powdered materials in dry condition, then adding to them a quantity of water, or solution of salts, which will make the resulting mixture of the proper consistency for use in a battery. I have found that by placing the manganese dioxid and the carbonaceous material in a tumble mill, either empty or containing steel balls or flint pebbles, or other mixing agents, and adding a large excess of water, then operating the mill to mix the solid materials and water for a considerable length of time, varying according to conditions, from ten minutes to several hours, and then removing the excess of water by filtration, or otherwise, I obtain an intimate mixture of the manganese and carbonaceous material which is not otherwise obtained, and that when this intimate mixture is placed in a battery very satisfactory results are obtained.

In constructing a battery using this material, I may take a zinc can and a carbon pencil and wrap or otherwise attach the depolarizing material, consisting of the thoroughly mixed manganese dioxid and carbonaceous conductive material produced by the above method, about the carbon, securing it in place in the ordinary manner; and then inserting between the depolarizing material and the can a suitable electrolyte such as is well known in the art, and thus secure a battery which is approximately 10% more efficient than batteries heretofore otherwise constructed. Other types of battery construction, well known in the art may also be used in connection with the above described intimate mixture of manganese dioxid and carbonaceous material.

Having thus described my invention, what I claim as new and desire to secure by Letters Patent, is:—

1. A method of intimately mixing materials for a depolarizing compound for dry cells, which comprises: introducing powdered carbonaceous material and powdered depolarizing material and an excess quantity of water into a mixing machine, violently agitating the mixture for a suitable length of time, and then removing the excess of water from the mixture.

2. A method of intimately mixing materials for a depolarizing compound for dry cells, which comprises: introducing powdered carbonaceous material and powdered depolarizing material and an excess quantity of water into a mixing machine containing balls or pebbles, operating the machine to violently agitate the contents thereof, and removing the mixed powdered materials and separating the excess water from the mixture.

In witness whereof, I have hereunto subscribed my name in the presence of two witnesses.

JOSEPH W. WEISS.

Witnesses:
CHAS. E. REEDER,
BEN W. PARK.